United States Patent [19]

Lau et al.

[11] Patent Number: 5,733,956
[45] Date of Patent: Mar. 31, 1998

[54] LIGHT STABILIZER PACKAGES FOR PAINT APPLICATIONS

[75] Inventors: Edmund Kwok-Leung Lau, Arlington, Tex.; David K. Edge, Livonia, Mich.

[73] Assignee: Solvay Engineered Polymers, Grand Prairie, Tex.

[21] Appl. No.: 461,999

[22] Filed: Jun. 5, 1995

Related U.S. Application Data

[63] Continuation of Ser. No. 36,607, Mar. 24, 1993.

[51] Int. Cl.$^6$ .............................. C08K 5/34; B32B 27/30; B32B 27/06; B32B 9/04
[52] U.S. Cl. .............................. 524/102; 524/91; 524/100; 428/500; 428/522; 428/482; 428/704
[58] Field of Search .............................. 524/91, 100, 102; 428/500, 522, 482, 704

[56] References Cited

U.S. PATENT DOCUMENTS

| | | | |
|---|---|---|---|
| 4,241,208 | 12/1980 | Murayama et al. | 546/20 |
| 4,616,051 | 10/1986 | Paolino | 524/102 |
| 4,692,486 | 9/1987 | Gugumus | 524/102 |
| 4,753,979 | 6/1988 | Conetta et al. | 524/102 |
| 4,778,837 | 10/1988 | Waterman et al. | 524/89 |
| 5,021,480 | 6/1991 | Ravichandran | 524/102 |
| 5,037,680 | 8/1991 | Papendick et al. | 428/31 |
| 5,096,950 | 3/1992 | Galbo et al. | 524/99 |
| 5,112,890 | 5/1992 | Behrens et al. | 524/95 |
| 5,124,378 | 6/1992 | Behrens et al. | 524/95 |
| 5,169,925 | 12/1992 | Schmailzl et al. | 524/102 |

FOREIGN PATENT DOCUMENTS 2 202 853  3/1988  United Kingdom.

OTHER PUBLICATIONS

Hans Zweifel, "Recent Progress in the Stabilization of Impact Modified PP".

Andrew Mar and Mark S. Holt, "Hindered Amino Ethers: A New Class of Radical Scavengers for Coatings," Feb., 1990.

*Primary Examiner*—Kriellion S. Morgan
*Attorney, Agent, or Firm*—Pennie & Edmonds LLP

[57] ABSTRACT

A light stabilizer package is disclosed. The light stabilizer package comprises a monomeric HALS having a pKa of no greater than 7, an ultraviolet light absorber and, optionally, a polymeric HALS having a pKa of less than 7. The light stabilizer package may be blended with a thermoplastic olefin to form a moldable light stable composition. An article comprising the moldable light stable composition may have an exterior surface that is at least partially coated.

18 Claims, No Drawings

5,733,956

LIGHT STABILIZER PACKAGES FOR PAINT APPLICATIONS

This is a continuation of application Ser. No. 08/036,607, filed Mar. 24, 1993.

BACKGROUND OF THE INVENTION

1. Field of the Invention

The present invention relates to light stabilizer packages which are capable of being blended with organic materials such as thermoplastic olefinic elastomer compounds (TPOs) to impart resistance to degradation from ultraviolet light to such materials. Compositions of these organic materials and light stabilizer packages can be molded into articles which are light stable while also being receptive for coatings of acid catalyst activated single component paint (1 pack paint) systems. In addition, the present invention relates the articles formed from these moldable light stabilized compositions.

2. Description of the Background Art

Organic materials in general, and specifically synthetic polymers, while widely utilized, have relatively poor light stability. For example, olefinic elastomer compounds tend to undergo severe deterioration when exposed to light such as sunlight or ultraviolet rays. Light stabilizers that had previously been used to increase the resistance of such olefinic elastomer compounds against light included ultraviolet light absorbers such as benzotriazole compounds and benzophenone compounds. It was later found that N-unsubstituted polyalkylpiperidine Hindered Amine Light Stabilizers (hereinafter HALS's) such as, for example, those disclosed in U.S. Pat. No. 4,241,208 of Murayama et al., provide superior protection to olefinic elastomer compounds against photo-induced degradation as compared to the ultraviolet light absorbers. Currently, photo-induced degradation of olefinic elastomer compounds such as TPOs is combatted by adding HALS to the coatings applied to an olefinic elastomeric compound otherwise formulated without any stabilizers or by including basic HALS in the olefinic elastomeric formulation.

When an HALS is added to a coating that is applied to a molded TPO article, the entire article must be coated in order to stabilize all portions of the article against ultraviolet degradation. An example of a composition of HALS that can be added to a coating that can be applied to a TPO article is described in the brochure distributed by Ciba-Geigy Corporation entitled "Tinuvin® 440 UV Light Stabilizer for Acid Catalyzed Coatings" wherein a composition of 1.0%–2.0% Tinuvin® 440 by weight, based on the coating resin solid and of 2.0%–4.0% Tinuvin® 1130 by weight, based on the coating resin solids, is disclosed.

Further, it has been found that when a basic HALS compound is included as part of a TPO formulation to provide light stability to a TPO, the TPO either must remain unpainted or can only be painted with two component paint systems. It has been found that when a basic HALS compound is added to a TPO formulation to provide light stability to a TPO, the TPO cannot effectively be coated with a 1 pack paint system because such paint systems react with the compound so that the paint does not cure properly and poorly adheres to the substrate. In addition, for 1 pack paint clearcoat systems, the light stabilizing effect of the HALS compound might be neutralized, resulting in photo-degradation of the TPO. It is believed that the reason for this reaction is because basic HALS compounds react with the acidic organic pigments and curative agents of the 1 pack paint systems. Other factors affecting the paint adhesion are the affinity behavior among the components of the TPO formulation, the migration characteristics of the additives to the TPO formulation, the volatility of the additives to the TPO formulation and the thermal stability of the total system. The same problem has not been observed with two component paint systems since such systems are not acidic.

As noted above, when a TPO is coated with an HALS-containing coating, the entire molded TPO article must be coated in order to prevent ultraviolet degradation of any portion thereof. Further, current TPO stabilizer systems included as part of a TPO formulation are fully operational only when molded TPO articles do not have to be painted with 1 pack paint systems. It is often desirable for articles which are molded from such TPO formulations to be partially painted for decorative or aesthetic effects. For example, the exterior portion of automotive bumpers for certain models are made from molded TPO compositions which include conventional stabilizers, and which are pigmented to the desired color. These bumpers cannot be successfully coated with 1 pack paint systems for the reasons explained above. However, automobile designers would like to enhance the appearances of such bumpers by providing a 1 pack coating on portions thereof, while retaining the low weight and resiliency of the TPO. This cannot be accomplished with conventional TPO formulations.

Two solutions to this problem are currently known. First, it is possible to paint these articles with a two-component system, such as-a polyurethane, but this results in additional process steps for coating the article as well as greater cost for the coating materials. Alternatively, it is possible to formulate the TPO without any stabilizers, but this would require coating of the entire article with a coating containing HALS, or else the uncoated areas would degrade over time when exposed to ultraviolet light.

Accordingly, a need exists for a stabilizer system that can be added to a TPO formulation to impart ultraviolet light resistance to the TPO formulations while also enabling such formulations to be unreactive toward 1-pack paint systems so that portions of the articles made from the TPOs can be painted.

SUMMARY OF THE INVENTION

The invention relates to a light stabilizer package for TPOs. The package comprises a monomeric HALS having a basicity or pKa of no greater than 7, an ultraviolet light absorbing agent and a polymeric HALS having a basicity or pka of less than 7. Preferably, the monomeric light stabilizer is a piperidine derivative or a piperazinone having a basicity or pKa of 6 or less. Preferably, the ultraviolet light absorbing agent is benzotriazole or benzophenone compound. Preferably the polymeric HALS is a piperidine polymer having a basicity or pKa of 6.5 or less. Preferably, the monomeric light stabilizer is present in an amount of between about 30 and 65%, the light absorber is present in an amount of between about 25 and 45% and the polymeric light absorber is present in an amount of between about 10 and 35%. Preferably, the monomeric light stabilizer is present in an amount that is equal to or greater than that of the ultraviolet light absorbing agent or the polymeric light stabilizer. The three components may be present in substantially the same amount.

The invention further relates to a light stabilized composition comprising a TPO and a light stabilizer package. Preferably, the light stabilizer package comprises a monomeric HALS light stabilizer having a basicity or pKa of no more than 7 in combination with an ultraviolet light absorbing agent. Preferably, the light stabilizer is a piperidine derivative having a basicity or pKa of 6 or less. Preferably, the ultraviolet light absorbing agent is benzotriazole or benzophenone compound. Preferably, the light stabilizer is present in amount of about 40–90% of the light stabilizer package and the ultraviolet light absorbing agent is present in an amount of between 10 and 60% of the light stabilizer package. Preferably, the light stabilizer is present in an amount equal to or greater than the ultraviolet light absorbing agent. The package may also comprise a polymeric HALS having a basicity or pKa of less than 7. Preferably the polymeric HALS is a piperidine polymer having a basicity or pKa of 6.5 or less. Preferably, in this three component package the monomeric light stabilizer is present in an amount of between about 30 and 80% of the light stabilizer package, the light absorber is present in an amount of between about 10 and 45% of the light stabilizer package and the polymeric light absorber is present in an amount of between about 10 and 35% of the light stabilizer package. Preferably, the monomeric light stabilizer is present in an amount that is equal to or greater than that of the polymeric light stabilizer. All three components may be present in substantially the same amount.

The light stabilizer package may be present in an amount of about 0.4 to 2% by weight of the light stabilized composition.

The invention further relates to an article having an exterior surface comprising a molded light stabilized polymeric composition as described above, and a coating upon a portion of the exterior surface thereof. Preferably, the composition comprises a TPO and a light stabilizer package. The light stabilizer package may comprise a monomeric HALS having a basicity or pKa of no greater than 7 in combination with an ultraviolet light absorbing agent. The package may also include a polymeric HALS having a basicity or pKa of less than 7. Preferably, the coating is a one-pack coating and, more preferably, comprises an acrylic, alkyd, melamine, polyester, thermoplastic or elastomeric material. The light stabilizer package may be present in an amount of about 0.4 to 2% by weight of the composition. Preferably, the TPO comprises a homopolymer and a copolymer of $CH_2=C—(R)_2$, where R is H or a $C_1–C_6$ straight or branched alkyl moiety. Preferably, the TPO comprises a blend of at least a homopolymer and a copolymer. More preferably, the TPO comprises crystalline polypropylene or polyethylene and amorphous ethylene-propylene copolymer rubber or ethylene-propylene terpolymer resin, or mixtures thereof either from an intensive mixing process or from sequential polymerization in reactors.

DETAILED DESCRIPTION OF THE INVENTION

The light stabilizer packages of the present invention provide light stability to TPO compositions containing them in addition to being unreactive with 1-pack. acid catalyzed paint systems. The package is a three-component package which comprises a monomeric HALS having a basicity or pKa of no more than 7, an ultraviolet light absorbing agent and a polymeric HALS having a basicity or pKa of less than 7.

A TPO is a polyolefinic resin which can be heated and softened innumerable times without suffering any basic alteration in characteristics. A polyolefin is a polymer, or union, of compounds hat are unsaturated, chemically active hydrocarbons with one carbon-carbon double bond. Examples of olefins include polyethylene, polypropylene, etc. Polyolefins result from the union of such olefins. Polyolefins can be the result of blending the same or different olefins. Examples of thermoplastic polyolefinic formulations and their formulations can be found in, for example, U.S. Pat. Nos. 4,945,005 and 4,997,720

The monomeric HALS of the present invention have pKa of no greater than 7. Thus, the monomeric HALS's are preferably acidic in nature but may be neutral. Preferably, the monomeric HALS of the present invention has a pKa of 6 or less. The pKa may be 5 or less, 4.2 or less or even 2.6 or less. The monomeric HALS is preferably a piperidine derivative or a piperazinone derivative. More preferably, the monomeric HALS is an N-substituted polyalkylpiperidine or N-substituted polyalkylpiperazinone derivative, and most preferably is a secondary or tertiary N-substituted polyalkylpiperidine or a secondary or tertiary N-substituted polyalkylpiperazinone such as, for example, an N—H tetramethyl piperidine derivative, an o-octyl analogue of an N—H tetramethyl piperidine derivative, a tetramethylpiperazinone, etc. Examples of the monomeric HALS of the present invention include Tinuvin® 440 of Ciba-Geigy Corporation, a piperidine derivative HALS having a pKa of 2.5; Tinuvin® 123 of Ciba-Geigy Corporation, an o-octyl analogue of the NH HALS having a pKa of 4.2; Goodrite 3159® of B. F. Goodrich Co., a tetramethylpiperazinone HALS having a pKa of 6; and Cyasorb® UV-3668 of Cytec Industries, a derivative of a tetramethyl piperidine having a pKa of 5.0.

The UV light absorbers of the present invention can be any of the presently known UV light absorbers. Presently known UV light absorbers include, for example, 2-(2'-hydroxyphenyl)benzotriazoles, 2-hydroxy benzophenones, etc. Examples of benzotriazole UV absorbers of the present invention are, for example, 2-(2'-hydroxy-3',5'-di-t-butyl)-5-chlorobenzotriazole such as Tinuvin® 327 of Ciba-Geigy Corporation and 2-[2'-hydroxy-3',5'-(di-t-amyl)phenyl]-benzotriazole such as Tinuvin® 328 of Ciba-Geigy Corporation. An example of a benzophenone UV absorber of the present invention is, for example, 2-hydroxyl-4-n-octylbenzophenone such as Cyasorb® UV 531 of Cytec Industries.

The polymeric HALS of the present invention having a basicity or pKa of less than 7 is added to the package to form a three component light stabilizer package. Examples of polymeric HALS that can be used in the present invention include Tinuvin® 622 of Ciba-Geigy Corp., having a pKa of 6.5.

Preferably, the monomeric HALS is added in an amount equal to or greater than both the ultraviolet light absorber and the polymeric HALS. In this three component light stabilizer package, the monomeric HALS is preferably present in an amount of from about 30–80%, the ultraviolet light absorber is preferably present in an amount of from about 10–45% of the light stabilizer package and the polymeric HALS is added in an amount of about 10–35% of the light stabilizer package. In a preferred embodiment, all three components are present in substantially the same amount.

The characteristics of monomeric and polymeric HALS's that may be used in the present invention are compared to other HALS's that are traditionally used as light stabilizers in Table 1.

TABLE I

Hindered Amine Light Stabilizers

| Hindered Amine[1] | pKa | Functional Group | M.W. |
|---|---|---|---|
| Chimassorb ® 944 | 9.7 | N—H | >2500 |
| Chimassorb ® 119 | 9.2 | N—CH$_3$ | 2286 |
| Tinuvin ® 770 | 9.0 | N—H | 481 |
| Tinuvin ® 144 | 8.5 | N—CH$_3$ | 685 |
| Tinuvin ® 622 | 6.5 | N—R | >2500 |
| Tinuvin ® 123 | 4.2 | N—O—C$_8$H$_{17}$ | 737 |
| Tinuvin ® 440 | 2.5 | N—COCH$_3$ | 435 |

[1]All Hindered Amines in Table I are products of Ciba-Geigy Corporation.

The pKa values of Tinuvin® 622 and Tinuvin® 440 render the light stabilizer package of the present invention less basic. Thus, the light stabilizer package of the present invention will not readily react with the acid in the 1-pack paint systems, unlike, for example, Tinuvin® 770 and Chimassorb® 944, which are very basic. Further, the HALS of the present invention are slower to migrate to the surface of the molded parts, which migration affects paint adhesion, than for example, Tinuvin® 770.

Examples of the percentages of the components that can be used in the light stabilizer packages of the present invention are described in Table II.

TABLE II

LIGHT STABILIZER PACKAGES
(% of total package)

| Component | Package 1 | Package 2 | Package 3 |
|---|---|---|---|
| Monomeric HALS | 33.3 | 42.8 | 42.8 |
| UV Absorber | 33.3 | 42.8 | 28.6 |
| Polymeric HALS | 33.3 | 14.3 | 28.6 |

As noted above, the monomeric HALS is present in an amount which is equal to or greater than the amounts of either of the light absorber or polymeric HALS. Thus, the monomeric HALS may be present in a relative amount of between and between about 30% and 80% of the three component package. The light absorbing agent may be present in an amount of between about 10 to 45% in the three component package. The polymeric HALS may be present in an amount of between about 10 and 35% of the three component package.

The moldable light stabilized polymeric composition of the present invention comprises TPO and a light stabilizer package. The light stabilizer package comprises (1) a monomeric hindered amine light stabilizer having a basicity or pKa of no greater than 7, (2) an ultraviolet light absorbing agent and, optionally, (3) a polymeric hindered amine light stabilizer having a basicity or pKa of less than 7.

Preferably the TPO of the present invention comprises a homopolymer and a copolymer of CH$_2$=C—(R)$_2$ where R is H or a C$_1$-C$_6$ straight or branched alkyl moiety, and, more preferably, comprises a homopolymer of crystalline polypropylene. Preferably, the TPO is a blend of crystalline polypropylene and amorphous ethylene-propylene copolymer rubber.

Preferably, at least about 0.4 by weight of the light stabilized polymeric composition is the light stabilizer package. More preferably, the light stabilizer package is present in an amount of about 0.4-2% of the light stabilized polymeric composition of the present invention.

In these compositions, which can include either two component or three component packages, the monomeric HALS may be present in an amount of between about 0.1 and 1%, preferably between about 0.1 and 0.5%, the light absorbing agent may be present in an amount of between about 0.1 and 1%, preferably between about 0.1 and 0.5% and the polymeric HALS may be present in an amount of between about 0.1 and 0.8%, preferably between about 0.1 and 0.4%.

Examples of the percentages of the components of the light stabilizer packages that can be used in the light stabilized polymeric compositions of the present invention are described in Table III.

TABLE III

LIGHT STABILIZED POLYMERIC COMPOSITIONS (% of polymeric composition)

| Component | Package 4 | Package 5 | Package 6 |
|---|---|---|---|
| Monomeric HALS | 0.4 | 0.2 | 0.3 |
| UV Absorber | 0.3 | 0.2 | 0.3 |
| Polymeric HALS | 0.2 | 0.2 | 0.3 |

| | Package 7 | Package 8 | Package 9 |
|---|---|---|---|
| Monomeric HALS | 0.3 | 0.3 | 0.3 |
| UV Absorber | 0.3 | 0.2 | 0.3 |
| Polymeric HALS | 0.1 | 0.2 | |

As noted above, the monomeric HALS may be present in an amount which is equal to or greater than the amounts of either of the light absorber or polymeric HALS. Thus, the monomeric HALS may be present in a relative amount of between 40 and 90% of the two component package, and between about 30% and 80% of the three component package. The light absorbing agent may be present in an amount of between about 20 and 60% in the two component package and between about 25 to 45% in the three component package. The polymeric HALS may be present in an amount of between about 10 and 35% of the three component package.

The article of the present invention has an exterior surface which comprises the moldable light stabilized polymeric composition of the present invention. At least a portion of the exterior surface of the article may be coated with one-pack coating comprising, for example, an acrylic, alkyd, melamine, polyester, thermoplastic or elastomeric material.

The foregoing and other objects, features, aspects and advantages of the present invention will become more apparent from the following detailed non-limiting examples of the present invention.

EXAMPLE 1

In the following examples, various light stabilizer packages were mixed into commercially available TPO's to form light stabilized polymeric compositions. Test plaques (4"× 6"×⅛") were then injection molded and studied.

EXAMPLE 2

The light stabilizer package described in Table IV was mixed with one of two TPO's to form a light stabilized polymeric composition.

TABLE IV

Light Stabilizer Packages

| Component | (% of package) |
|---|---|
| Tinuvin ® 440 | 47.5 |
| Tinuvin ® 327 | 37.5 |
| Tinuvin ® 622 | 25.0 |

The TPO's are either Dexflex® 980 of D&S Plastics, Inc. or Dexflex® 815 of D&S Plastics Inc. Each of the two light stabilized polymeric compositions was painted with three different 1 pack paint systems and tested for TPO/paint interactions. Before painting, the test specimens were first wiped with isopropyl alcohol and air blasted to remove the dust. After a five-minute flash, these specimens were coated with the adhesion promoter, then the base coat, and then, optionally, the clearcoat. Typical film thicknesses of these various coatings were 0.1–0.3 mil for the adhesion promoter, 0.6–0.8 mil for the basecoat, and 1.2–1.5 mil for the clearcoat. After painting, the specimens were cured in an oven at 120° C. for 30 minutes. Testing used to evaluate the TPO/paint interactions are as follows:

1. In the initial adhesion test, a clear cellophane adhesive tape, Nichiban® of Nichiban Co., Ltd., is used to pull on a 3 mm cross hatched paint surface;
2. In the gasoline immersion test, a synthetic gasoline mixture of 45% toluene and 55% naphthalene is used to soak the painted plaques. Paint lift and peeling is checked every half hour for up to six hours;
3. In the humidity test, the painted plaques are exposed for 240 hours at 38°±2° C. to an atmosphere having 98%±2% relative humidity. Blister rating is tested by visual observation according to ASTM D-714. Adhesion is tested by pulling on a 3 mm cross hatched surface with Permacel® masking tape of Permacel Corp. and, alternatively, with 1 inch wide Scotch® filament tape, part no. 898, of 3M Packaging Systems Division. Targeting is for no loss of adhesion and a blister rating of 9 and above five minutes after completion of the exposure cycle.
4. In the water immersion test, the painted plaques are soaked in water at 40° C. for 96 hours or at 38° C. for 240 hours. Blistering is tested by visual observation according to ASTM D-714. Adhesion is tested by pulling on 3 mm cross hatched surface with Permacel® masking tape of Permacel Corp. and, alternatively, with 1 inch wide Scotch® filament tape, part no. 898, of 3M Packaging Systems Division. Targeting is for no loss of adhesion and a blister rating of 9 and above five minutes after completion of the exposure cycle.

TABLE V

EFFECT ON PAINTABILITY

| TPO Compound Color | | Dexflex 980 Red | | | Dexflex 980 Blue | | | Dexflex 815 Natural | | | Dexflex 815 Red | | |
|---|---|---|---|---|---|---|---|---|---|---|---|---|---|
| Paint System | | 1 | 2 | 3 | 1 | 2 | 3 | 1 | 2 | 3 | 1 | 2 | 3 |
| Tests | | | | | | | | | | | | | |
| Tackiness | | Heavy | None | None | None | None | None | Slight | None | None | None | None | None |
| Init. Adhesion | | Fail | Pass | Pass | Pass | Pass | Fail | Pass | Pass | Fail | Pass | Pass | Pass |
| Water Immersion 40° C./96 Hr. | Blister | 9F | 9F | 9F | 9F | 9F | 9F | 9F | 9F | 9F | 9F | 10 | 9F |
| | Permacel | Pass | Pass | Pass | Pass | Pass | Pass | Pass | Pass | Pass | Pass | Pass | Pass |
| | 898 | Pass | Pass | Pass | Pass | Pass | Pass | Fail | Pass | Pass | Fail | Pass | Pass |
| Water Immersion 38° C./240 | Blister | 9M | 9M | 8F | 9M | 9F | 9F | 9M | 5F | 9F | 9M | 9M | 9F |
| | Permacel | Pass | Pass | Pass | Pass | Pass | Pass | Pass | Pass | Pass | Pass | Pass | Pass |
| | 898 | Fail | Pass | Pass | Pass | Pass | Pass | Pass | Fail | Pass | Pass | Pass | Pass |
| Humidity 38° C./240 Hr. | Blister | 9F | 9F | 9F | 9M | 9F | 9F | 9M | 9M | 9F | 9F | 9M | 9F |
| | Permacel | Pass | Pass | Pass | Pass | Pass | Pass | Pass | Pass | Pass | Pass | Pass | Pass |
| | 898 | Pass | Pass | Pass | Pass | Pass | Pass | Pass | Pass | Pass | Pass | Pass | Pass |
| Gasoline Immersion Test | | SC | Pass | Pass | SC | Pass | Pass | Pass | In | In | CF | In | SC |

Paint Sytems:
1. Adhesion Promoter-MPP4110 of PPG Indus. Inc.; Basecoat-CBC light blue base of PPG Indus. Inc.; Clearcoat-UCC1001 clear coat of PPG indus. Inc.
2. Adhesion Promoter-MPP4110 of PPG Indus. Inc.; Basecoat-DWB Blue of PPG Indus. Inc.; Clearcoat-UCC1001 of PPG Indus. Inc.
3. Adhesion Promoter-MPP4110 of PPG Indus. Inc.; Basecoat-Bee 30 low gloss primer of Morton Paint Co.
Blister Quantity Ratings: (ASTM D-714)
F = few; M = Medium; MD = Medium Dense; D = Dense
Blister Size Ratings:
10 = None; 9 = Micro; 8 = Pencil Point; 7 thru 1 = Increasing Larger
Gasoline Immersion:
In = Incipient Failure; CF = Catatrosphic Failure; SC = Slight Curling (only catastrophic failure is considered failure)

The data shows that the light stabilized composition of the present invention is less reactive toward 1-pack paint systems. Failure of the light stabilized polymeric composition in the Initial Adhesion test for Paint System 3 is attributable to the aggressiveness of the paint system rather than the light stabilizer package. This suggests that a less aggressive paint system should be used for optimum results.

EXAMPLE 3

The light stabilizer packages described in Table VI were blended with Dexflex 980 TPO to form light stabilized polymeric compositions.

TABLE VI

| | Light Stabilizer Packages (% of Package) | | |
|---|---|---|---|
| | (% of Package) | | |
| Component | Package 10 | Package 11 | Package 12 |
| Tinuvin ® 440 | 37.5 | | |
| Tinuvin ® 327 | 25.0 | 25.0 | 37.5 |
| Tinuvin ® 622 | 37.5 | 37.5 | 25.0 |
| Tinuvin ® 123 | | 37.5 | 37.5 |

The paintability of the light stabilized polymeric compositions was determined using the same testing procedures as described in Example 2 for the initial adhesion, gasoline soak and humidity tests, except that the humidity test was performed at 38° C. for 240 hours. The test results are summarized in Table VII.

TABLE VII

EFFECT ON PAINTABILITY

| Light Stabilized Composition | Paint System | Init. Adhesion | 38° C./ 240 Hr. Humidity | 1 Hr. Gasoline Immersion Test |
|---|---|---|---|---|
| Package 10 + TPO | 1 | Pass | Pass | Pass |
| | 2 | Pass | Pass | Pass |
| | 3 | Pass | Pass | Pass |
| Package 11 + TPO | 1 | Pass | Pass | Pass |
| | 2 | Pass | Pass | Pass |
| | 3 | Pass | Pass | Pass |
| Package 12 + TPO | 1 | Pass | Pass | Pass |
| | 2 | Pass | Pass | Pass |
| | 3 | Pass | Pass | Pass |

Paint Systems:
1. Adhesion Promoter-Bee HP-21054-4W1 of Morton Paint Co.; Basecoat-872-99642 of E.I. DuPont de Nemours & Co., Inc.; Clearcoat-RK3939 of E.I. DuPont de Nemours & Co., Inc.
2. Adhesion Promoter-MPP-4110 of PPG Indus. Inc.; Basecoat-UBC of PPG Indus. INC.; Clearcoat-UCC-1000 of PPG Indus. Inc.
3. Adhesion Promoter-MPP-4110 of PPG Indus. Inc.; Basecoat-Bee UR560 of Morton Paint Co.; Clearcoat-Bee Q65837 of Morton Paint Co.

The results of the data shows that the light stabilized polymeric composition of the present invention pass the initial adhesion, humidity and gasoline immersion tests.

EXAMPLE 4

The light stabilizer packages described in Table VIII were blended with Dexflex 980 TPO to form light stabilized polymeric compositions.

TABLE VIII

| | Light Stabilizer Packages (% of Package) | | | | | | | |
|---|---|---|---|---|---|---|---|---|
| Component | Package 13 | Package 14 | Package 15 | Package 16 | Package 17 | Package 18 | Package 19 | Package 20 |
| Tinuvin ® 123 | 62.5 | 37.5 | 37.5 | 37.5 | 75.0 | 37.5 | 37.5 | 37.5 |
| Tinuvin ® 328 | 37.5 | 37.5 | 37.5 | 37.5 | 25.0 | 25.0 | 25.0 | 25.0 |
| Tinuvin ® 622 | | 25.0 | | | | 37.5 | | |
| Chimmasorb ® 944 | | | | 25.0 | | | | 37.5 |
| Chimmasorb ® | | | 25.0 | | | | 37.5 | |

The TPO/paint interactions of the various light stabilizers of Table VIII mixed with Dexflex 980 TPO was tested by the initial adhesion and humidity test, using the same procedures as described in Example 3. The results are shown in Table IX.

TABLE IX

EFFECT ON PAINTABILITY

| Polymeric Composition | Init. Adhesion | Humidity °C. (240 Hr., 38° C.) |
|---|---|---|
| Package 13 + TPO | Pass | Pass |
| Package 14 + TPO | Pass | Pass |
| Package 15 + TPO | Pass | Fail (6/64) |
| Package 16 + TPO | Pass | Fail (5/64) |
| Package 17 + TPO | Pass | Pass |
| Package 18 + TPO | Pass | Fail (5/64) |
| Package 19 + TPO | Pass | Fail (18/64) |
| Package 20 + TPO | Pass | Fail (12/64) |

The results of the data shows that the light stabilized compositions of the present invention (compositions 13, 14 and 17) pass the humidity test while the light stabilized compositions outside the scope of the claimed invention (compositions 15, 16, 19 and 20) fail the humidity test. Light stabilized composition 18, which is a light stabilized composition of the present invention, failed the himidity test due probably to the presence of too much Tinuvin 622, having a pKa of 6.5, in comparison to the other components therein.

EXAMPLE 5

The light stabilizer packages described in Table X were blended with Dexflex® 826 of D & S Plastics, Inc. to form light stabilized polymeric compositions. The light stabilized compositions of the present invention were compared against standard samples for paintability. The test procedures were the same as described in Example 4, except that the humidity test was performed at 38° C. for 240 hours. The results are summarized in Table XI.

TABLE X

Light Stabilizer Packages

| | (% of Package) | | |
|---|---|---|---|
| Component | Package 21 | Package 22 | Package 23 |
| Tinuvin 440 | 33 | | 50 |
| Tinuvin 123 | | 33 | |
| Tinuvin 328 | 33 | 33 | 50 |
| Tinuvin 622 | 33 | 33 | |

TABLE XI

EFFECT ON PAINTABILITY

| Composition | Paint System | Init. Adhesion | Humidity 240 Hr./38° C. |
|---|---|---|---|
| Package 21 + TPO | 1 | Pass | Pass |
| | 2 | Pass | Pass |
| Package 22 + TPO | 1 | Pass | Pass |
| | 2 | Pass | Fail |
| Package 23 + TPO | 1 | Pass | Pass |
| | 2 | Pass | Fail |
| 4.0% Carbon Black/No Uv | 1 | Pass | Pass |
| | 2 | Pass | Fail |

Paint Systems:
1. Adhesion Promoter-HP-21054-4B1 of Morton Paint Co.; Basecoat-BAH-3 Red Metallic of PPG Indus. Inc.; Clear coat-UCC-1001 of PPG Indus. Inc.
2. Adhesion Promoter-HP-21054-4B1 of Morton Paint Co.; Base coat-89013-6-UR560 (White) of Morton Paint Co.

The results show that the light stabilized compositions of the present invention passes the initial adhesion test and passes the humidity test at the same rate as does the standard samples.

EXAMPLE 6

The light stabilizer system of the present invention is compared against conventional light stabilizer systems and standard systems.

The components of the light stabilizer packages used in the light stabilized polymeric compositions are described in Table XII. The components of the TPO's are described in Table XIII. The light stabilized polymeric compositions are described in Table XIV.

TABLE XII

Light Stabilizer Polymeric Compositions

| Package | | Package | % of Component in polymeric composition |
|---|---|---|---|
| A | high | Tinuvin ® 770 | 0.40 |
| | | Cyasorb ® UV 531 | 0.40 |
| | | Cyasorb ® 944 | 0.40 |
| A | medium | Tinuvin ® 770 | 0.30 |
| | | Cyasorb ® UV 531 | 0.30 |
| | | Cyasorb ® 944 | 0.30 |
| A | low | Tinuvin ® 770 | 0.20 |
| | | Cyasorb ® UV 531 | 0.20 |
| | | Cyasorb ® 944 | 0.20 |
| B | high | Tinuvin ® 440 | 0.60 |
| | | Tinuvin ® 327 | 0.45 |
| | | Tinuvin ® 622 | 0.30 |
| B | medium | Tinuvin ® 440 | 0.40 |
| | | Tinuvin ® 327 | 0.30 |
| | | Tinuvin ® 622 | 0.20 |
| B | low | Tinuvin ® 440 | 0.20 |
| | | Tinuvin ® 327 | 0.15 |
| | | Tinuvin ® 622 | 0.10 |

TABLE XIII

TPO

| TPO | Composition | % of TPO |
|---|---|---|
| HiRb | Polypropylene | 66 |
| | Rubber | 30 |
| | Carbon Black | 4 |
| HiTa | Polypropylene | 56 |
| | Rubber | 20 |
| | Talc | 20 |
| | Carbon Black | 4 |

The interaction between the light stabilized polymeric compositions of Table XIV and paint systems were determined.

The initial adhesion test was performed the same as in Example 2. The humidity test was performed the same as in Example 2 except that exposure was for 168 hours at 38° C. and 240 hours at 38° C. The water immersion test was performed the same as in Example 2, except that the painted plaques were soaked for 168 hours at 38° C. and for 240 hours at 38° C.

TABLE XIV

EFFECT ON PAINTABILITY

| | Hi Rb, no UV | | Hi Rb, A-low | | Hi Rb, A-high | | Hi Rb, A-med | |
|---|---|---|---|---|---|---|---|---|
| Paint System | 1 | 2 | 1 | 2 | 1 | 2 | 1 | 2 |
| Tests | | | | | | | | |
| Initial Adhesion Water Immersion | Pass | Pass | Pass | Pass | Pass | Pass | Pass | Pass |
| 7 day 10 day Humidity | Pass Pass | Pass Pass | Failed after 1 day | | Failed after 1 day | | Failed after 1 day | |
| 7 day 10 day | Pass Pass | Pass Pass | Failed after 1 day | | Failed after 1 day | | Failed after 1 day | |

| | Hi-TA, no UV | | Hi-TA, A-low | | Hi TA, A-high | | Hi Rb, B-med | |
|---|---|---|---|---|---|---|---|---|
| Paint System | 1 | 2 | 1 | 2 | 1 | 2 | 1 | 2 |
| Tests | | | | | | | | |
| Initial Adhesion Water Immersion | Pass | Pass | Pass | Pass | Pass | Pass | Pass | Pass |
| 7 day 10 day Humidity | Pass Pass | Pass Pass | Failed after 1 day | | Failed after 1 day | | Pass Pass | Pass Pass |
| 7 day 10 day | Pass Pass | Pass Pass | Failed after 1 day | | Failed after 1 day | | Pass Pass | Pass Pass |

| | Hi-TA, B-med | | Hi Rb, B-low | | Hi Rb, B-high | | B-med | |
|---|---|---|---|---|---|---|---|---|
| Paint System | 1 | 2 | 1 | 2 | 1 | 2 | 1 | 2 |
| Tests | | | | | | | | |
| Initial Adhesion Water Immersion | Pass | Pass | Pass | Pass | Pass | Pass | Pass | Pass |
| 7 day 10 day Humidity | Pass Pass | Pass Pass | Pass Pass | Pass Pass | Pass Fail | Pass Pass | Pass Pass | Pass Pass |
| 7 day 10 day | Pass Pass | Pass Pass | Pass Pass | Pass Pass | Pass Fail | Pass Pass | Pass Pass | Pass Pass |

Paint System
1. Adhesion Promoter-HP-21054-4B1 of Morton Paint Co.; Base coat-UR560CAFH vermillion 1K of Morton Paint Co.
2. Adhesion Promoter-HP-21054-4B1 of Morton Paint Co.; Base coat-89000-HC UR560CAFH Wild Strawberry 1 of Morton Paint Co.; Clear coat - Q65837 of Morton Paint Co.

The results show that show that the light stabilized compositions of the present invention provide significant improvement in light stability over the UV systems of the prior art.

Although the present invention has been described in detail, it is clearly understood that the same is by way of example only and is not to taken by way of limitation, the scope of the invention being limited only by the terms of the appended claims.

What is claimed is:

1. A partially painted article having
   an exterior surface and comprising a molded light stabilized polymeric composition that does not interfere with acid curative coating systems, said polymeric composition comprising
   (a) a thermoplastic polyolefin;
   (b) a monomeric hindered amine light stabilizer having a basicity or pKa of no greater than 7, said monomeric light stabilizer selected from the group consisting of polyalkyl piperidinyl acetamide compounds, polyalkyl piperidinyl ester compounds and triazaspiro-alkane-dione compounds;
   (c) a polymeric hindered amine light stabilizer of a polyalkyl piperidin-succinic acid coplymer having a basicity or pKa of no greater than 7; and
   (d) an ultraviolet light absorbing agent of a benzotriazole compound,
   wherein each of the monomeric hindered amine light stabilizer, the ultraviolet light absorbing agent and the polymeric hindered amine light stabilizer are present in an amount effective to provide a stable substrate for an acid catalyst activated single component paint system, and wherein at least a portion of said surface is coated with said acid catalyst activated single component paint system.

2. The article of claim 1 wherein the coating comprises an acrylic, alkyd, melamine, polyester, thermoplastic or elastomeric material.

3. The article of claim 1 wherein the light stabilizer package is present in an amount of about 0.4 to 2% by weight of the composition.

4. The article of claim 1 wherein the thermoplastic olefin comprises a homopolymer or copolymer of $CH_2=C-(R)_2$ where R is H or a $C_1-C_6$ straight or branched alkyl moiety.

5. The article of claim 4 wherein the thermoplastic olefin comprises crystalline polypropylene or polyethylene and at least one amorphous copolymer.

6. A method of making a partially painted thermoplastic polyolefin article that does not interests with an acid curative coating system, said method comprising the steps of:

incorporating into a thermoplastic polyolefin, (a) a monomeric hindered amine light stabilizer having a basicity or pKa of no greater than 7, said monomeric light stabilizer selected from the group consisting of polyalkyl piperidinyl acetamide compounds, polyalkyl piperidinyl ester compounds and triazaspiro-alkene-dione compounds; (b) a polymeric hindered amine light stabilizer of a polyalkyl piperidin-succinic acid copolymer having a basicity or pKa of no greater than 7; and (c) a light absorbing agent of a benzotriazole compound; wherein each of the monomeric hindered amine light stabilizer, the ultraviolet light absorbing agent and the polymeric hindered amine light stabilizer are present in an amount effective to provide a stable substrate for an acid catalyst activated single component paint system; and painting at least a portion of said stabilized thermoplastic polyolefin with an acid catalyst activated single component paint system to form a stable, partially painted thermoplastic polyolefin article.

7. A method according to claim 6 wherein the hindered amine light stabilizer is present in an amount greater than or equal to the ultraviolet light absorbing agent.

8. A method according to claim 6 wherein the monomeric hindered amine light stabilizer is present in an amount of between about 30% and 80%, the light absorbing agent is present in an amount of between about 10% and 45% and the polymeric hindered amine light stabilizer is present in an amount of between about 10% and 35%.

9. An article according to claim 1 wherein the monomeric hindered amine light stabilizer is a piperidine or piperazinone derivative having a basicity or pKa of less than 7.

10. An article according to claim 1 wherein the monomeric hindered amine light stabilizer has a basicity or pKa of between about 2.5 and 5.

11. An article according to claim 9 wherein the monomeric hindered amine light stabilizer has a basicity or pKa of between about 2.5 and 5.

12. The article of claim 1 wherein the hindered amine light stabilizer is present in an amount of between about 50 and 80% and the ultraviolet light absorbing agent is present in an amount of between about 20 and 50%.

13. The article of claim 12 wherein the hindered amine light stabilizer is present in an amount equal to or greater than the ultraviolet light absorbing agent.

14. The article of claim 1 wherein the monomeric hindered amine light stabilizer is present in an amount of between about 30% and 80%, the light absorbing agent is present in an amount of between about 10% and 45% and the polymeric hindered amine light stabilizer is present in an amount of between about 10% and 35%.

15. The article of claim 14 wherein the monomeric hindered amine light stabilizer is present in an amount equal to or greater than the amount of the light absorbing agent and is present in an amount that is equal to or greater than the amount of the polymeric hindered amine light stabilizer.

16. The article of claim 1 wherein the monomeric hindered amine light stabilizer is 2,2,6,6-tetramethyl-4-(2-dodecyl-succinamidyl)-piperydinyl acetamide; bis(2,2,6,6-tetramethyl-1-(octyloxy)-4-piperydinyl)ester; or 1,3,8-Triazaspiro(4.5)decane-2,4-dione.

17. The article of claim 1 wherein the ultraviolet light absorbing agent is 2-[2'-hydroxy-3',5'-(di-t-amyl)phenyl] benzotriazole.

18. The article of claim 1 wherein the polymeric hindered amine light stabilizer is N-(2-hydroxyethyl)-2,2,6,6-tetramethylpiperidin-4-ol-succinic acid copolymer.

* * * * *